W. A. JOHNSON.
AUTOMOBILE LOCK.
APPLICATION FILED APR. 20, 1910.
1,151,363.
Patented Aug. 24, 1915.
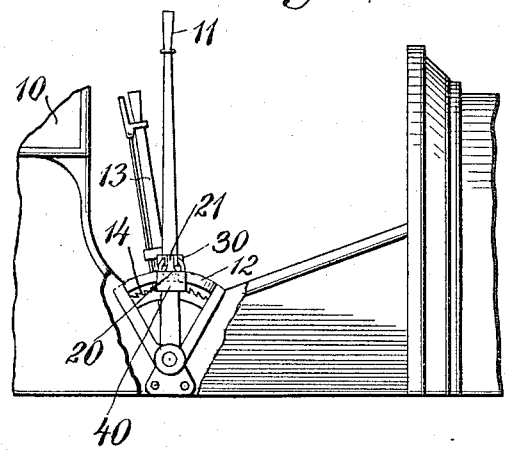
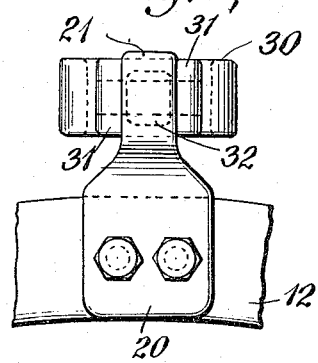
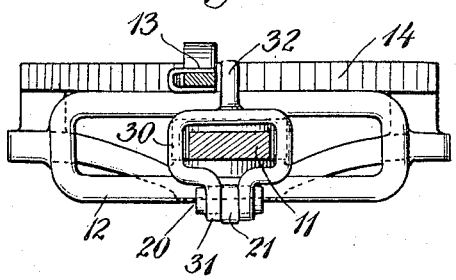
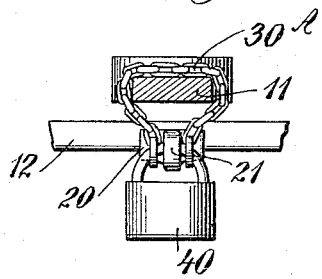
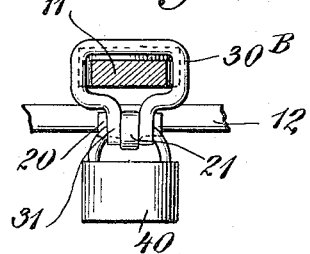
WITNESSES:
INVENTOR
William A. Johnson
BY
E. W. Marshall
ATTORNEY

UNITED STATES PATENT OFFICE.

WILLIAM A. JOHNSON, OF YONKERS, NEW YORK.

AUTOMOBILE-LOCK.

1,151,363.  Specification of Letters Patent.  Patented Aug. 24, 1915.

Application filed April 20, 1910. Serial No. 556,625.

*To all whom it may concern:*

Be it known that I, WILLIAM A. JOHNSON, a citizen of the United States, and a resident of Yonkers, in the county of Westchester and State of New York, United States of America, have invented certain new and useful Improvements in Automobile-Locks, of which the following is a specification.

My invention relates to automobile locks, and its object is to provide a device for locking the controlling levers of an automobile when it is not in use, which device is simple of construction and may be readily applied to a car without alterations thereon, and which will effectively lock the machine so that it cannot be taken away until it is released by the person who has a key for unlocking the device.

Referring to the drawings, Figure 1 is a side elevation of certain parts of an automobile, including the controlling lever for its transmission gear, and its brake lever, showing these levers locked by means of one of my devices. In Fig. 2 some of these same parts are shown in plan partly in section on a larger scale. Fig. 3 is a front elevation of the parts of my novel locking device. In Figs. 4 and 5, I have illustrated two modifications of my invention in plan view.

Like characters of reference designate corresponding parts in all of the figures.

10 designates such parts of an automobile as need be shown to illustrate the manner in which my invention is applied thereto. 11 is a lever by means of which the transmission gearing between the engine and the driving wheels is controlled. This lever in all of the figures in which it appears, is shown in its central or off position. Surrounding this lever is a segmental casing 12 which is rigidly and permanently affixed to the car.

The brake lever is designated by 13. When this lever is drawn back into the position in which it is shown in Figs. 1 and 2, the brake is applied. These brake levers are usually supplied with a holding mechanism such as the rack and pawl device shown in the drawings of which the segmental rack is designated by 14.

20 is a locking lug which is to be permanently affixed to the casing 12, or to some other convenient fixed part of the automobile, at a position opposite or nearly opposite the neutral position of the controlling lever 11. If bolts are used for fastening this locking lug, their ends should be riveted over so that they cannot be removed without great difficulty. So too, if the casing or other part of the machine to which the lug is affixed is detachably secured to the car, it should be riveted or otherwise permanently fastened in order to make this device most effective. The upper part of the locking lug 20 which is designated by 21 is preferably constructed in the form of a flat piece projecting vertically above the casing 12 at right-angles to the part of the casing to which it is affixed and is provided with a transverse hole.

30 is a locking collar which is arranged to surround three sides of the lever 11 and to partially surround its fourth side. On this fourth side the collar is bent around to form two ears 31 with an open space between them slightly greater than the width of the part 21 of the stationary lug. These ears have holes drilled in them in such positions that they may be brought into alinement with the hole in the locking lug.

32 is a lug projecting from the opposite side of the collar 30.

Before more particularly describing the other figures of the drawings I will point out the manner in which the device is used. As has been stated the locking lug 20 is permanently affixed to the car. The collar 30, however, is a loose member separable from the lever. When this device is to be used the lever is brought to a position opposite that of the stationary locking lug. The collar 30 is then slipped over the lever 11 at that portion thereof which is directly below its handle which is of considerably smaller dimensions than that part of the lever which is opposite the locking lug. The collar is then slipped down until its ears are brought over the part 21 of the locking lug, with the holes therein in alinement with the hole in the locking lug. A shackle of a padlock 40, which may be of any ordinary construction, is then placed through the holes in the ears of the collar 30 and the hole in the stationary locking lug, thus securely locking the parts together and effectively preventing movement of the lever 11.

If the car is stopped on a hill, or for other reasons it is desired to have its brakes applied, the lever 13 is pulled back, before the collar is slipped down over the lever 11, until the forward edge of this lever is at a point back of the position which the lug 32, which projects from one side of the collar 30, will assume. Then when the collar is locked in place, as previously described the brake lever cannot be moved forward to release the brakes.

Fig. 4 shows a chain 30$^A$ used instead of a rigid collar. Collar 30$^B$ shown in Fig. 5 is similar to that shown in Fig. 2, with the lug 32 omitted. These arrangements shown in Figs. 4 and 5 are used in a similar manner to that previously described, but they do not lock both the transmission gear lever and the brake lever.

It is to be particularly noted that this device in no way decreases the strength of the controlling levers or other parts of the automobile's mechanism, as is the case with some of the locking arrangements which require that a hole or holes be drilled in the lever which is to be locked. It is also applicable to machines of standard construction without any change in the form or construction of its parts, although, of course, the locking lug may be made any integral part of the casing 12 or other part of the machine if so desired.

Several modifications of my invention are illustrated to show that I do not limit myself to any specific form or construction.

What I claim is.—

1. In combination, a manually movable controlling lever, a lock therefor, said lock comprising a lug fixed with relation to said lever and provided with a hole, a collar adapted to be placed about the lever and movable longitudinally thereon, ears projecting from the collar and each provided with a hole arranged to be brought into alinement with the hole in the lug, and a padlock with its shackle arranged to be locked through the holes in said ears and the hole in the fixed lug.

2. In an automobile, manually movable levers, a lock therefor, said lock comprising a fixed lug, a collar adapted to be placed about one of the levers, means for locking the collar and the fixed lug together, and a lug projecting from said collar into the path of movement of the other lever or levers.

3. In an automobile, manually movable controlling levers, a lock therefor, said lock comprising a fixed lug provided with a hole, a rigid collar adapted to be placed about one of the levers, ears projecting from the collar and provided with holes which may be brought into alinement with the hole in the fixed lug, a padlock having a shackle arranged to be locked through the holes in said ears and the hole in the fixed lug; and a lug projecting from said collar into the path of movement of the other lever or levers.

In testimony whereof I have signed my name to this specification in the presence of two subscribing witnesses.

WILLIAM A. JOHNSON.

Witnesses:
ELLA TUCH,
ERNEST W. MARSHALL.

Copies of this patent may be obtained for five cents each, by addressing the "Commissioner of Patents, Washington, D. C."